United States Patent
Goel et al.

(10) Patent No.: US 11,354,699 B2
(45) Date of Patent: Jun. 7, 2022

(54) MOBILE DEVICE ACTIVITY DETECTION

(71) Applicant: Google LLC, Mountain View, CA (US)

(72) Inventors: Samir Goel, San Francisco, CA (US); Gaurav Jain, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/865,813

(22) Filed: May 4, 2020

(65) Prior Publication Data

US 2020/0265460 A1 Aug. 20, 2020

Related U.S. Application Data

(63) Continuation of application No. 15/468,969, filed on Mar. 24, 2017, now Pat. No. 10,713,682, which is a
(Continued)

(51) Int. Cl.
*G06Q 30/02* (2012.01)
*G06Q 30/04* (2012.01)

(52) U.S. Cl.
CPC ......... *G06Q 30/0242* (2013.01); *G06Q 30/02* (2013.01); *G06Q 30/0246* (2013.01); *G06Q 30/0273* (2013.01); *G06Q 30/04* (2013.01)

(58) Field of Classification Search
CPC .... G06Q 30/0242; G06Q 30/04; G06Q 30/02; G06Q 30/0246; G06Q 30/0273; G06Q 30/0241; G06F 3/048; G06F 3/14
See application file for complete search history.

(56) References Cited

U.S. PATENT DOCUMENTS 6,317,782 B1 11/2001 Himmel et al.
6,477,575 B1 * 11/2002 Koeppel ................ G06Q 30/02
709/224
(Continued)

FOREIGN PATENT DOCUMENTS

JP 2001-344511 12/2001
JP 2002-221926 8/2002
(Continued)

OTHER PUBLICATIONS

"How to detect page zoom level in all modern browsers?". Stack Overflow, Question asked on Nov. 7, 2011. available at: https://stackoverflow.com/questions/1713771/how-to-detect-page-zoom-level-in-all-modern-browsers: (Year: 2011).*
(Continued)

*Primary Examiner* — Eric R Netzloff
(74) *Attorney, Agent, or Firm* — Fish & Richardson P.C.

(57) ABSTRACT

Methods, systems and apparatus for identifying illegitimate selections of content items. In some implementations, one or more servers can receive display data specifying a display state of a web page in a viewport. The web page includes a content item. Display instances are identified. A display instance is a display of at least a portion of the content item in the viewport. Selection instances of the content item are identified. A selection instance is a selection of the content item. The server(s) determines whether a selection of the content item occurred during a display of at least a portion of the content item in the viewport based on the display instances and the selection instances. A selection of the content is defined as an illegitimate selection if the selection did not occur during a display of at least a portion of the content item in the viewport.

20 Claims, 8 Drawing Sheets

Related U.S. Application Data continuation of application No. 12/535,168, filed on Aug. 4, 2009, now abandoned.

(56) References Cited

U.S. PATENT DOCUMENTS

| | | | |
|---|---|---|---|
| 7,339,573 B2 | 4/2008 | Andert et al. | |
| 7,461,353 B2 | 12/2008 | Rohrabaugh et al. | |
| 2002/0056124 A1* | 5/2002 | Hay | H04N 21/44222 725/87 |
| 2003/0149621 A1 | 8/2003 | Shteyn | |
| 2004/0015608 A1 | 1/2004 | Ellis et al. | |
| 2005/0235318 A1 | 10/2005 | Grauch et al. | |
| 2006/0190354 A1 | 8/2006 | Meisel et al. | |
| 2006/0224695 A1 | 10/2006 | Willis | |
| 2006/0230141 A1 | 10/2006 | Willis | |
| 2007/0043616 A1 | 2/2007 | Kutaragi et al. | |
| 2007/0061211 A1 | 3/2007 | Ramer | |
| 2007/0100653 A1 | 5/2007 | Ramer et al. | |
| 2007/0203878 A1 | 8/2007 | Fortes | |
| 2008/0040653 A1 | 2/2008 | Levine | |
| 2008/0109327 A1 | 5/2008 | Mayle et al. | |
| 2008/0172288 A1 | 7/2008 | Pilskains et al. | |
| 2008/0275757 A1 | 11/2008 | Sharma et al. | |
| 2008/0319774 A1 | 12/2008 | O'Sullivan et al. | |
| 2009/0063206 A1 | 3/2009 | Payne et al. | |
| 2009/0177538 A1* | 7/2009 | Brewer | G06Q 30/02 705/14.54 |
| 2009/0326966 A1* | 12/2009 | Callaghan | G06Q 30/0241 705/1.1 |
| 2010/0153836 A1* | 6/2010 | Krassner | H04L 67/36 715/234 |
| 2010/0217666 A1 | 8/2010 | Belenguer | |
| 2010/0230876 A1 | 9/2010 | Bowra | |
| 2010/0287013 A1* | 11/2010 | Hauser | G06Q 10/06375 705/7.37 |
| 2010/0287134 A1* | 11/2010 | Hauser | G06Q 30/02 706/54 |
| 2010/0287566 A1* | 11/2010 | Hauser | G06F 9/542 719/318 |
| 2011/0029393 A1* | 2/2011 | Apprendi | G06F 11/3419 705/14.73 |
| 2013/0024251 A1* | 1/2013 | Preiss | G06Q 30/02 715/730 |

FOREIGN PATENT DOCUMENTS

| | | |
|---|---|---|
| JP | 2002-358462 | 12/2002 |
| JP | 2005-517361 | 6/2005 |
| JP | 2006-134173 | 5/2006 |
| JP | 2010-529523 | 8/2010 |
| WO | 2001/45017 | 6/2001 |
| WO | 2004/102285 | 11/2004 |
| WO | 2007/092261 | 8/2007 |
| WO | 2008/122686 | 10/2008 |
| WO | 2008/137194 | 11/2008 |

OTHER PUBLICATIONS

"Catch browser's "zoom" event in JavaScript", Stack Overflow, Question asked on Jun. 15, 2009. available at: https://stackoverflow.com/questions/995914/catch-browsers-zoom-event-in-javascript: (Year: 2009).*

CA Office Action in Canadian Application No. 3,047,453, dated Sep. 3, 2020, 7 pages.

'www.en.wikipedia.org' [online] "Viewport," Jun. 6, 2009 [retrieved on Oct. 2, 2018] Retrieved from Internet: URL<https://en.wikipedia.org/w/index.php?title=Viewport&oldid=294742315> 1 page.

AU Notice of Acceptance in Australian Application No. 2015258352, dated Mar. 22, 2017, 3 pages.

AU Notice of Acceptance in Australian Application No. 2015258352, dated Mar. 22, 2017, 3 pages (No new art).

AU Office Action issued in Australian Application No. 2015258352, dated Aug. 1, 2016, 3 pages (No new art).

AU Office Action issued in Australian Application No. 2017204530, dated Feb. 28, 2019, 3 pages.

AU Office Action issued in Australian Application No. 2017204530, dated Jun. 26, 2018, 6 pages.

CA Office Action in Canadian Application No. 2,769,246, dated Jun. 17, 2019, 13 pages.

CA Office Action in Canadian Application No. 2,769,246, dated May 15, 2020, 5 pages.

CA Office Action issued in Canadian Application No. 2,769,246, dated Aug. 23, 2018, 5 pages.

CA Office Action issued in Canadian Application No. 2769246, dated Jul. 20, 2017, 4 pages.

CA Office Action issued in Canadian Application No. 2769246, dated Sep. 2, 2016, 4 pages (No art).

EP Extended European Search Report issued in European Application No. 10807011.1 dated Jun. 24, 2015, 7 pages.

EP Office Action issued in European Application No. 10807011.1, dated Aug. 3, 2017, 8 pages.

EP Summons to Attend Oral Proceedings in European Application No. 10807011.1, dated Oct. 19, 2018, 11 pages.

KR Notice of Allowance in Korean Application No. 10-2012-7003074, dated Nov. 25, 2016, 4 pages.

KR Notice of Allowance issued in Korean Application No. 10-2017-7005358, dated Nov. 1, 2017, 3 pages (with English Translation).

KR Office Action issued in Korean Application No. 10-2012-7003074 dated May 19, 2016, 11 pages (with English abstract).

KR Office Action issued in Korean Application No. 10-2017-7005358, dated Jun. 16, 2017, 8 pages (with English Translation).

New car window sticker for 2005 Mercedes Benz CLK 320.

PCT International Preliminary Report on Patentability, PCT/US2010/044217, dated Feb. 16, 2012, 9 pages.

PCT Notification of Transmittal of the International Search Report and the Written Opinion of the International Searching Authority, or the Declaration for International Application No. PCT/US10/44217 dated Sep. 30, 2010, 14 pages.

CA Office Action in Canadian Appln. No. 3047453, dated May 26, 2021, 7 pages.

* cited by examiner

MOBILE DEVICE ACTIVITY DETECTION

CROSS-REFERENCE TO RELATED APPLICATIONS

This application is a continuation application of, and claims priority to, U.S. patent application Ser. No. 15/468,969, titled "MOBILE DEVICE ACTIVITY DETECTION," filed on Mar. 24, 2017, which application is a continuation application of, and claims priority to, U.S. patent application Ser. No. 12/535,168, titled "Determining Impressions for Mobile Devices," filed on Aug. 4, 2009. The foregoing applications are incorporated herein by reference in their entirety for all purposes.

BACKGROUND

An impression occurs when an advertisement is placed on a web page rendered for display on a client device such as a desktop computer or a mobile device (e.g., multimedia phone). Depending on the web page and the client device, the advertisement may not be visible to a user of the device because the advertisement is placed on a portion of the web page that is not in the device's viewport. For example, because of the zoom level of the viewport (e.g., the viewport is zoomed-in), the size of the viewport and/or the dimensions of the web page, not all of the web page's contents can be displayed in the viewport at the same time. For mobile devices displaying a web page such a scenario is a common occurrence because of the mobile device's relatively small viewport. Because advertisers are typically charged for an impression if the advertisement is placed on a rendered web page, an advertiser may be charged even if the advertisement is placed on a portion of the web page that is not in the viewport and, thus, not visible to the user.

Further, depending on the web page and the client device, the web page may be displayed in a viewport at a zoom level that permits the entire page to be displayed in the viewport (e.g., the viewport is zoomed-out). Many mobile device's employ this strategy to present the entire web page to the user. However, typically, at such zoom levels the contents of the web page are illegible or difficult to discern, including any advertisements. Thus even though the zoom level of the viewport may prevent an advertisement from being read by a user, the advertiser may nonetheless be charged for an impression, as the advertisement was placed on a rendered web page.

SUMMARY

In general, one aspect of the subject matter described in this specification can be implemented in methods that include receiving at a data processing apparatus display data specifying a display state of a web page in a viewport, the web page including a content item for display; determining, by the data processing apparatus, a proportional measurement from the display data, the proportion measurement being a measure of a first portion of the content item displayed in the viewport relative to a second portion of the content item that is not displayed in the viewport; determining, by the data processing apparatus, a zoom level measurement from the display data, the zoom level measurement being a measure of a zoom level of the viewport; and determining, by the data processing apparatus, whether an impression for the content item occurred based on the zoom level measurement and the proportional measurement. Other embodiments of this aspect include corresponding systems, apparatus, and computer program products.

Another aspect of the subject matter described in this specification can be implemented in methods that include receiving at a data processing apparatus display data specifying a display state of a web page in a viewport, the web page including a content item for display; identifying, by the data processing apparatus, display instances from the display data, a display instance being a display of at least a portion of the content item in the viewport; identifying, by the data processing apparatus, selection instances of the content item from the display data, a selection instance being a selection of the content item; determining by the data processing apparatus whether a selection of the content item occurred during a display of at least a portion of the content item in the viewport based on the display instances and the selection instances; defining a selection of the content as a legitimate selection if the selection occurred during a display of at least a portion of the content item in the viewport; and defining a selection of the content as a illegitimate selection if the selection did not occur during a display of at least a portion of the content item in the viewport. Other embodiments of this aspect include corresponding systems, apparatus, and computer program products.

Yet another aspect of the subject matter described in this specification can be implemented in methods that include receiving at a data processing apparatus display data specifying a display state of a web page in a viewport; determining, by the data processing apparatus, a zoom level measurement from the display data, the zoom level measurement being a measure of a zoom level of the viewport; identifying a content item associated with the web page, the content item having a display location on the web page; identifying an alternative representation of the content item; providing the content item for display in the viewport at the display location, wherein the content item is displayed only if the zoom level measurement exceeds a zoom level threshold; and providing the alternative representation of the content item for display in the viewport at the display location, wherein the alternative representation is displayed only if the zoom level measurement does not exceed the zoom level threshold. Other embodiments of this aspect include corresponding systems, apparatus, and computer program products.

Particular embodiments of the subject matter described in this specification can be implemented so as to realize one or more of the following advantages. An advertiser will not be charged for an impression of an advertisement placed on a rendered web page if the advertisement is not discernable (e.g., the contents of the advertisement are difficult to read or cannot be read) or displayed to a user.

If a selection of an advertisement is determined to have occurred while the advertisement was not in the viewport then the selection can be classified as an illegitimate selection, such as a selection as a result of spamming activities. Such a selection will not be recorded as an impression (e.g., preventing errors in impression statistics) and the advertiser will not be charged.

If the viewport is at a low zoom level (e.g., the viewport is zoom-out) causing an advertisement in the viewport to not be discernable, then a discernable representation of the advertisement (e.g., the logo of the advertiser) can replace the advertisement to facilitate brand recognition of the advertisement or advertiser at the low zoom level.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

The present disclosure relates to determining impressions of advertisements placed on rendered web pages displayed in a viewport of a mobile device. An impression is determined to have occurred if a display of an advertisement in the viewport exceeds certain display thresholds so that the advertisement is likely to be discernible to a user of the device. These display thresholds can include, for example, the percentage of the advertisement displayed in the viewport of the device and the zoom level of the viewport (or scale of the viewport). The display thresholds can also include the duration with which the advertisement is displayed in the viewport.

If a display of an advertisement in the viewport satisfies the display thresholds then an impression is determined to have occurred and the advertiser can be charged for the impression. As a display of an advertisement exceeding the display thresholds is deemed discernable by the user, the advertiser receives the benefit of the impression. An impression will not be determined to have occurred, even if there is an actual display of the advertisement, unless the display thresholds are satisfied. For example, an advertisement can be fully displayed in the viewport, but if the zoom level of the viewport is below the zoom level threshold (e.g., causing the advertisement to be illegible) an impression will not be recorded. Even though the advertisement is displayed, an impression will not be recorded because the advertiser did not receive the benefit of having the user exposed to the advertisement in a manner that allows the user to discern the advertisement (e.g., recognize the content of the advertisement).

Although many mobile devices are multimedia capable, a significant number of web pages are nonetheless designed to be rendered and displayed on client devices such as desktop computers and laptop computers ("primary client devices") having relatively large viewports. As such, advertisements and other web page content on these web pages are located and sized based on the display area afforded by the viewport of these devices so that certain web page content (e.g., articles and advertisements) are simultaneously displayed in the viewport and are discernable (e.g., legible) to a user.

However, when these same web pages are displayed on mobile devices, which generally have smaller viewports than primary client devices, either less of the content is simultaneously displayed (e.g., only one article and no advertisements) as the mobile device viewports are zoomed-in to make the content discernable on the smaller viewports. Alternatively, the same amount of content as displayed by the primary client devices can be displayed in the viewports of mobile devices by zooming-out the mobile device viewports to make all of the content fit in the viewports. Unfortunately, at these zoom levels the content is difficult to discern or altogether illegible.

Figure 1B:
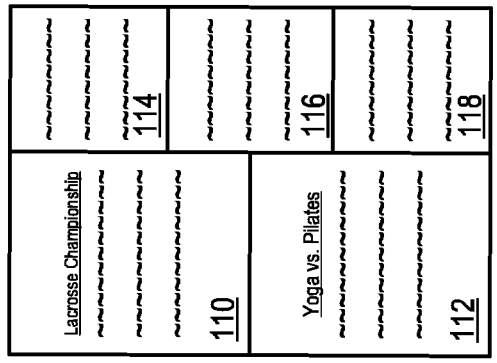
FIGS. 1A-1C are screen shots of an example web page displayed in a viewport of a primary client device, in a zoomed-out viewport of a mobile device, and a zoomed-in viewport of the mobile device, respectively.
Figure 1C:
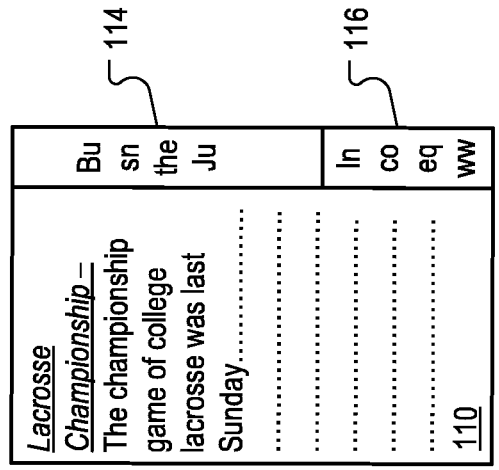
Figure 1A:
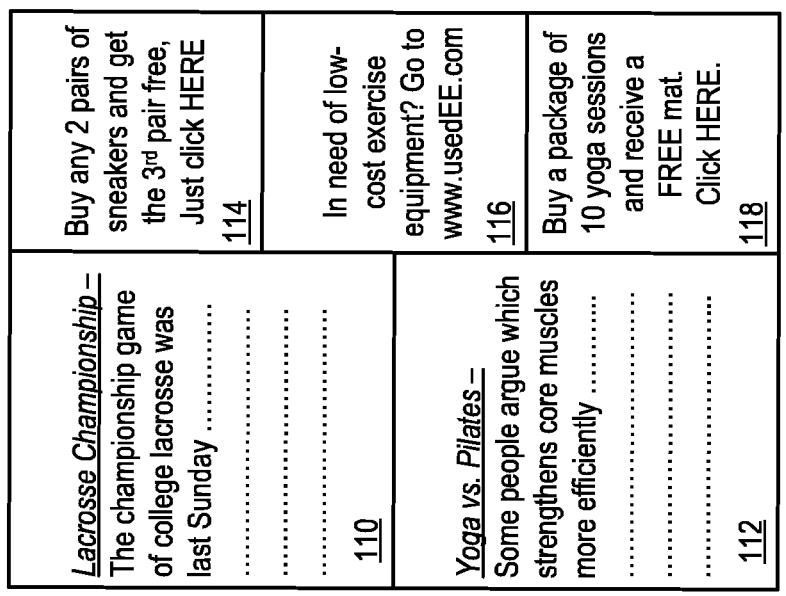

FIGS. 1A-1C are screen shots of an example web page 100 displayed in a viewport of a primary client device, in a zoomed-out viewport of a mobile device, and a zoomed-in viewport of the mobile device, respectively.

For reference, and as illustrated in FIG. 1A, the viewport of the primary client device shows all of article 110, article 112, advertisement 114, advertisement 116 and advertisement 118 (collectively, the web content). Because of the size of the viewport of the primary client device, all of the web page content is discernable and can be simultaneously displayed in the viewport.

As illustrated in FIG. 1B, the viewport of the mobile device is zoomed-out to allow all of the web content of the web page 100 to be simultaneously displayed in the viewport. Thus the same content displayed in the viewport of the primary device in FIG. 1A is displayed in the smaller viewport of the mobile device in FIG. 1B. However, because the viewport is zoomed-out to display all of the web content, the web content is no longer legible to a user. For example, article 110, article 112, advertisement 114, advertisement 116 and advertisement 118 are all displayed in the viewport but because the viewport is zoomed-out to accommodate all of the web content, the text and/or graphics of the web content are too small to be discerned by a user. Thus impressions for advertisements 114, 116 and 118 are determined to have not occurred even though they are displayed in the viewport.

As illustrated in FIG. 1C, the viewport of the mobile device is zoomed-in to make the portion of the web page 100 displayed in the viewport discernable to the user. However, because the viewport is zoomed-in to make the web content legible in the mobile device's smaller viewport, less of the web content can be simultaneously displayed. For example, only the article 110 is displayed in its entirely, and only portions of the advertisements 114 and 116 are displayed. Article 112 and advertisement 118 are not displayed in the viewport at all even though they have been rendered on the web page 100. Thus an impression has not occurred for advertisement 118 and, depending on the display thresholds described below, impressions may or may not be determined to have occurred for advertisements 114 and 116.

§ 1.0 Example Advertising Environment

Figure 2:
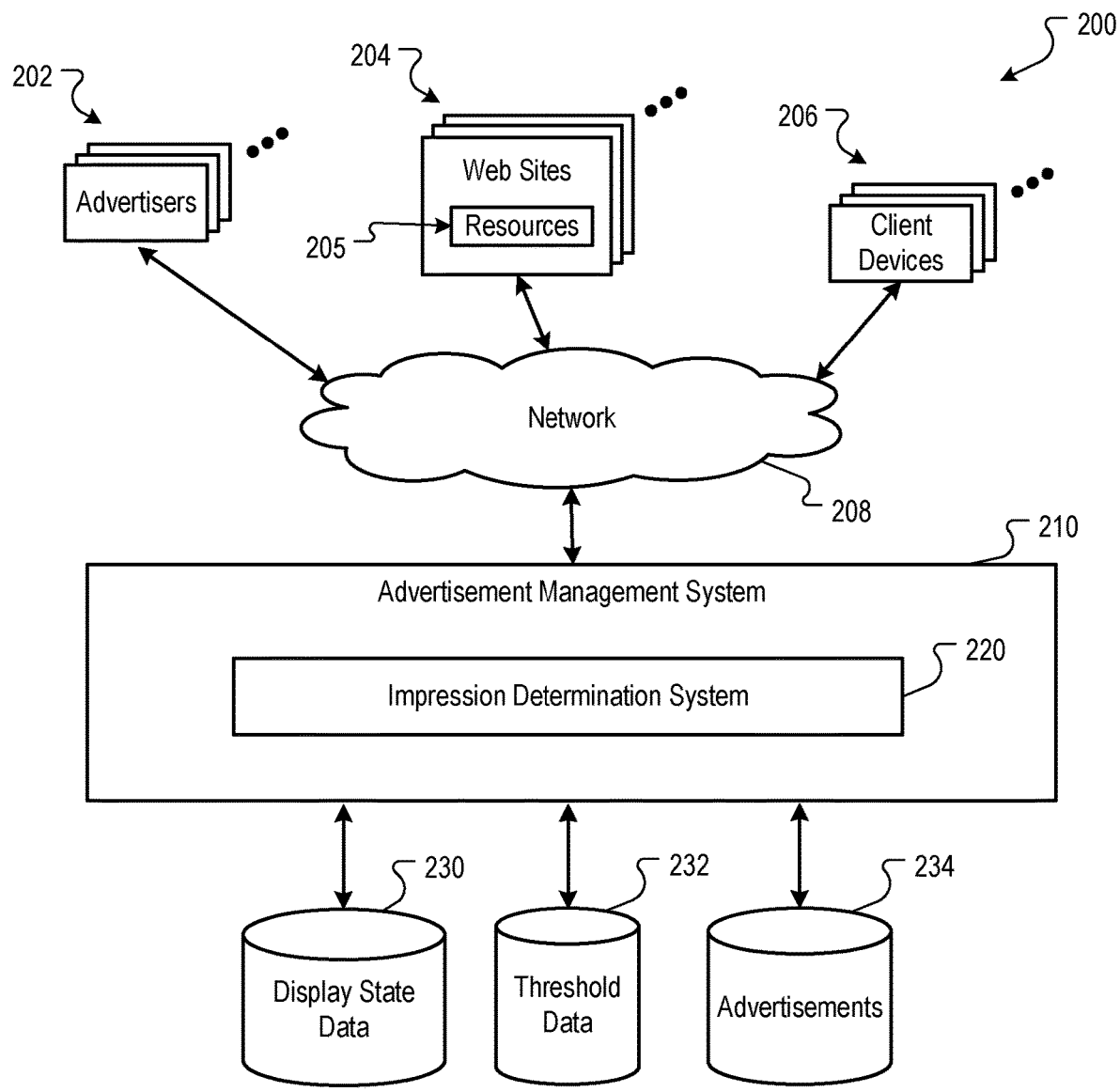
FIG. 2 is a block diagram of an example environment in which an impression determination system can be implemented.

FIG. 2 is a block diagram of an example environment 200 in which an impression determination system 220 can be implemented. The online environment 200 can facilitate the identification and serving of web content, e.g., web pages, advertisements, etc., to users. A computer network 208, such as a local area network (LAN), wide area network (WAN), the Internet, or a combination thereof, connects advertisers 202, an advertisement management system 210, web sites 204, and client devices 206. The online environment 200 may include numerous advertisers 202, web sites 204 and client devices 206.

One or more advertisers 202 can directly, or indirectly, enter, maintain, and track advertisement information in the advertising management system 210. The advertisements can be in the form of graphical advertisements, such as banner advertisements, text only advertisements, image advertisements, audio advertisements, and video advertisements. The advertisement management system 210 facilitates the selection and provisioning of advertisements for presentation on a web page resource 205. Advertisements can be stored in and selected from advertisement data store 234.

A web site 204 is one or more resources 205 associated with a domain name, and each web site 204 is hosted by one or more servers. An example web site is a collection of web pages formatted in hypertext markup language (HTML) that can contain text, graphic images, multimedia content, and programming elements, such as scripts. Each web site 204 is maintained by a publisher, e.g., an entity that manages and/or owns the web site. For brevity, the term "publisher" will also be used to refer to a web site 204 that is managed and/or owned by the publisher.

A resource 205 is any data that can be provided by the web site over the network 208 and that is associated with a resource address. Resources include HTML pages, word processing documents, and portable document format (PDF) documents, images, video, games, maps and feed sources, to name just a few. For the purposes herein, the term "web page resource", or simply "web page", will be used to describe resources that are accessed through a web browser or similar type of application for display on a user device. Web pages include content, e.g., words, phrases, images and sounds and may include embedded information (e.g., meta information and hyperlinks) and/or embedded instructions (e.g., JavaScript scripts). The web pages are stored and retrieved from web servers that host the web page, and are typically requested and served from the web server using Hypertext Transfer Protocol (HTTP).

A client device 206 is an electronic device that is under the control of a user and is capable of requesting and receiving data over the network 208. A client device 206 typically includes a user application, such as a web browser, to facilitate the sending and receiving of data over the network 208, such as requesting a resource (e.g., page content) from a web site 204. Example client devices 206 include personal computers, mobile communication devices, and other devices that can send and receive data over the network 208.

The advertisement management system 210 includes an impression determination system 220. The impression determination system 220 determines whether an impression has occurred for an advertisement placed on a web page that is rendered and displayed in the viewport of a client device 206, such as a mobile device, based on display data specifying a display state of the web page. A display state of a web page defines the portion of the web page displayed in the viewport, the portion of the web page not displayed in the viewport, and the location of content placed on the web page.

The portion of the web page displayed in the viewport can be defined relative to the dimensions (e.g., width and height) of the web page as created or authored. For example, with reference to a two-dimensional Cartesian coordinate system, the display state can specify that the portion of the web page displayed in the viewport is from a first displayed web page location, e.g., the coordinates of the top left pixel of the web page displayed in the viewport, to a second displayed web page location, e.g., the coordinates of the bottom right pixel of the web page displayed in the viewport. If the web page, for example, has a width and height of 1024 pixels and 768 pixels, respectively, and the display data specify that the first web page location is (0, 0) and the second web page location is (1024, 768), then the entire web page is displayed in the viewport. Likewise, if the display data specify that the first web page location is (512, 0), e.g., the top left pixel of the web page in the viewport, and the second web page location is (1024, 768), e.g., the bottom right pixel of the web page in the viewport, then only the bottom half of the web page is displayed in the viewport.

The location of content specified by the display data can also be defined relative to the dimensions of the web page. For example, the location of an advertisement placed on the web page can be defined by a first ad location and a second ad location. Thus, if the first ad location is (0, 0) and the second ad location is (50, 75) then the advertisement is placed at the top left corner of the web page, and has a width of fifty pixels (50−0=50) and a height of 75 pixels (75−0=75).

The location of content specified by the display data is not dependent on the portion of the web page displayed in the viewport. Thus the first and second ad locations are the same regardless of the portion of the web page displayed in the viewport.

Although the location of only one advertisement is described above, the display data specify locations for all advertisements placed on the web page.

The display data also specify the locations of other content on the web page, such as text articles, hyperlinks, image files, and the like. Based on the display data and/or a user-agent string in the HTTP header of a request sent by the client device, the size (e.g., area) of the viewport can be determined. The size of the viewport can be used to, for example, set the zoom level thresholds (e.g., for the same advertisement, smaller viewports will need a zoom level higher than that of larger viewports to permit the advertisement to be discernable). In some implementations, the display data include information from the user-agent string.

The display data can be stored in the display state data store 230. The impression determination system 220 can access and retrieve display data from the display state data store 230. The display data can be generated by the web browser rendering the web page at the direction of a script included in the web page, as described below with reference to FIG. 3.

As described above, impressions can be determined based on display thresholds such as the percentage of the advertisement displayed in the viewport, the zoom level of the viewport, and/or the duration with which the advertisement is displayed in the viewport. The impression determination system 220 can compare data derived from the display state of a web page to one or more of these display thresholds to determine whether an impression for an advertisement has occurred. The display thresholds for particular advertisements and/or client devices 206 can be stored in the threshold data store 232. In some implementations, advertisers 202 provide display thresholds for their advertisements.

§ 2.0 Example Process for Determining Impressions

Figure 3:
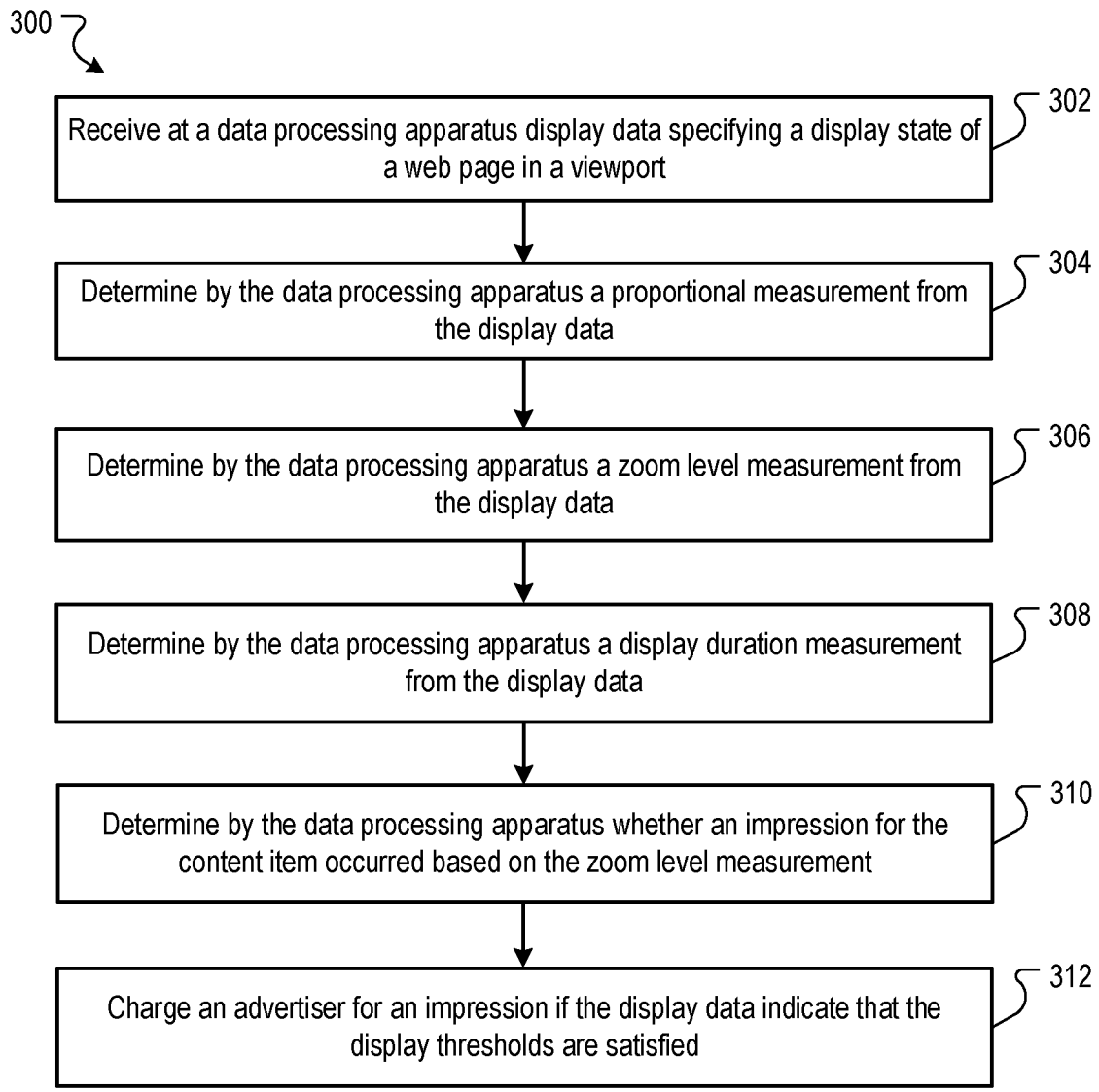
FIG. 3 is a flow chart of an example process for determining whether an impression has occurred.

FIG. 3 is a flow chart of an example process for determining whether an impression has occurred. The impression determination system 220 can, for example, perform the steps described with reference to FIG. 3.

Display data specifying a display state of a web page in a viewport is received (302). As described above the display state of a web page defines the portion of the web page displayed in the viewport and the location of content placed on the web page. The display data can include numerous display states that occur during a user session on a mobile device.

In some implementations a display data script (i.e., executable or interpreted program instructions), such as a JavaScript script, that is included in the web page and is executed by a web browser program operating on the client device to cause the display data to be generated. For example, the display data script can cause the web browser to examine the web page, generate the display data, and transmit the display data to the advertisement management system 210 and/or store the display data in display state data store 230.

The display data script can utilize a document object model (DOM) representation of the web page to determine some or all of the display data. For example, a web browser can include a layout engine to parse the web page to generate a DOM representation of the web page. In some implementations, the layout engine is distinct to the web browser but is in data communication with the web browser and works in concert with the web browser to render web pages.

The DOM representation provides a conduit through which scripts executed by the web browser can inspect and modify the web page. For example, the DOM representation permits the web browser, at the direction of the display data script, to examine the web page to determine the web page dimensions and the web content locations. The display data script can also cause the web browser to identify the first and second web page display locations. As a web page is often annotated with a markup language such as HyperText Markup Language (HTML), the display data script can also cause the web browser to identify the types of web content (e.g., an advertisement, an image) by identifying the annotations for the web content (e.g., an advertisement tag). Once the display data has been generated, it is sent to the impression determination system 220, or is accessed by the impression determination system 220 from a data store.

In some implementations, the data display script can be provided to publishers by the advertisement management system 210 for inclusion in a web page, can be obtained by publishers through use of the advertisement management system 210, or from third parties. In other implementations, the functionality of the display script can be embedded in the browser (e.g., a native browser function), can be provided by a browser extension, can be provided by a browser toolbar, or can be provided by other means such as Flash applications.

A proportional measurement is determined from the display data (304). The proportional measurement is a measure of a first portion of the content item displayed in the viewport relative to a second portion of the content item that is not displayed in the viewport. In some implementations, the proportional measurement is a ratio of the area of the advertisement, e.g., content item, displayed in the viewport (e.g., the first portion) and the total area of the advertisement (e.g., the first and second portions). The total area of the advertisement (e.g., content item) is independent of the area of the advertisement that is displayed in the viewport. The proportional measurement (PM) can be determined according to, for example, Equation 1:

$$PM = S_{AD}/S_A \quad \text{(Equation 1)}$$

Where $S_{AD}$ is the area of the advertisement displayed in the viewport, and $S_A$ is the total area of the advertisement.

The area of the advertisement can be measured in terms of the advertisement's dimensions in pixels. For example, the display data can specify that a web page has a width and height, respectively, of 1024 and 768 pixels, the first web page location is (0, 0), the second web page location is (512, 384), and that the first and second ad locations for an advertisement of interest placed on the web page are (0, 0) and (50, 75). The area of the advertisement displayed in the viewport (e.g., the first portion) is 3750 square pixels (50 pixels×75 pixels), as the entire advertisement is displayed in the viewport based on the first and second web page locations. The total area of the advertisement is also 3750 square pixels. Thus according to Equation 1, the proportional measurement is 3750/3750=1 or 100 percent.

Likewise, if the first and second ad locations for the advertisement are (487, 0) and (537, 75), then the area of the advertisement displayed in the viewport (e.g., the first portion) is 1875 square pixels (25 pixels×75 pixels) as only the top half of the advertisement is displayed in the viewport (i.e., the portion of the advertisement from (487, 0) to (512, 75)). As the total area is not dependent on the displayed portion, the total area remains 3750 square pixels. Thus according to Equation 1, the proportional measurement is 1875/3750=0.5 or 50 percent.

A zoom level measurement is determined from the display data (306). The zoom level measurement is a measure of a zoom level of the viewport. In some implementations, the zoom level measurement is representative of the area of the web page displayed in the viewport relative to a baseline display configuration. The zoom level measurement can indicate the scale with which web content is displayed in the viewport. The baseline display configuration can be, for example, the area of the web page to be displayed in the viewport as designed by the author or creator of the web page, and as delivered to the client device for display.

If the zoom level is high (e.g., zoomed-in) then compared to the baseline display configuration only a relatively small portion of the area of the web page occupies the entire viewport. In such a case, the relatively small amount of web content that is displayed in the viewport will appear at a larger scale (e.g., article 110 and advertisements 114 and 116 of FIG. 1B), which increases the likelihood that the web content can be discerned on devices with relatively small viewports such as mobile devices. However, if the zoom level measurement is low (e.g., zoomed-out), then compared to the baseline display configuration a relatively large portion of the area of the web page is displayed in the viewport. With low zoom level measurements, a large amount of the web content on the web page can be simultaneously displayed in the viewport (e.g., article 110, article 112, and advertisements 114, 116 and 118). However, on devices with small viewports (e.g., mobile devices) this can decrease the likelihood that the web content on web pages, for example, designed for display on primary client devices can be discerned.

In some implementations, the zoom level measurement (Z) is determined according to, for example, Equation 2:

$$Z = \frac{(A_{vi}) * \left(\frac{A_{ap}}{A_{vp}}\right)}{A_{ai}} \quad \text{(Equation 2)}$$

Where $A_{vi}$ is the area of the viewport in inches squared (or another metric);

$A_{ap}$ is the area of the advertisement in pixels squared;

$A_{vp}$ is the area of the viewport in pixels squared; and $A_{ai}$ is the area of the advertisement in inches squared (or another metric) as provided by the advertisement management system 210. In some implementations, the advertisement management system 210 and/or the publisher 204 can send $A_{ai}$ to the client device 206 (e.g., if the display data script causes the web browser to determine the zoom level measurement at the client device 206).

$A_{vi}$ can be determined, for example, based on the user-agent string in the HTTP header of the request sent by the client device. $A_{vp}$ can be determined, for example, from the coordinates of the top-left and bottom-right corner of the portion of the web page in the viewport (e.g., derived from first and second web page locations). $A_{ap}$ can be determined, for example, by traversing the DOM-tree and obtaining the coordinates of the top-left and bottom-right corner of the bounding box containing the advertisement (e.g., derived from the first and second ad locations).

A zoom level measurement of 1 indicates that as displayed in the viewport, the advertisement has an area equal to $A_{ai}$. The higher the zoom level measurement, the less web content that is simultaneously displayed, but the web content that is displayed is displayed in a larger scale (e.g., more readily discernable). The lower the zoom level, the more web content that is simultaneously displayed, but the web content that is displayed is displayed in a smaller scale (e.g., more difficult to discern).

As described above, Equation 2 can be used to determine a zoom level measurement. For example, the display data can specify that the first web page location is (0, 0), the second web page location is (1024, 768), the first ad location is (512, 384), the second ad location is (1024, 768), $A_{vi}$ is sixteen inches squared (e.g., based on the user agent string), and $A_{ai}$ is four inches squared. Thus $A_{ap}$ is (1024−512*768−384), $A_{vp}$ is (1024−0*768−0), and the ratio of $A_{ap}$ and $A_{vp}$ is 0.25. According to Equation 2, Z=1 ((0.25*16)/4), because as displayed in the viewport, the advertisement has an area equal to $A_{ai}$.

In some implementations, the zoom level measurement is determined by the client browser from a display parameter of the client browser. For example, some client browsers natively monitor and display zoom level measurements (e.g., the zoom level measurement is displayed in the bottom right corner of the client browser user interface).

A display duration measurement is determined from the display data (308). The display duration measurement is a measure of a duration that at least a portion of the content item is displayed in the viewport. Display duration measurements can be determined for multiple content items placed on the web page. The display data can include time data that are generated by a timer (e.g., based on the system clock of the client device) defined in the display data script that can be executed by the web browser. The time data specify durations with which content items (e.g., an advertisement) were displayed in the viewport in a manner that satisfies the display thresholds. These durations may span multiple display states (a display state with a 60% zoom level measurement and display state with a 75% zoom level measurement) if each of the display states satisfies the display thresholds (e.g., at least 55% zoom level measurements). In some implementations, the time data are generated by a counter defined in the display data script.

A duration specified by the time data starts when a content item is displayed in the viewport so as to satisfy the display thresholds, and ends when the display of the content item no longer satisfies one or more of the display thresholds. For example, if the display thresholds for an advertisement require that at least 50% of the advertisement has to be displayed in the viewport at a zoom level of at least 60%, then the duration will begin when a display of the advertisement satisfies those thresholds, and will end when one of those thresholds is no longer satisfied. For example, if the zoom level decreases to 55% then the duration is at an end. The display duration measurement can be used by the impression determination system 220 to ensure that the other display thresholds are satisfied during the same time period, and not separately satisfied during different time periods.

In some implementations, the display data script determines the proportional measurement, the zoom level measurement, and the duration measurement, and includes these measurements in the display data. As such, the proportional measurement, the zoom level measurement, and/or the duration measurement are determined at the client device 206 and sent to the advertisement management system 210. Further, the publisher from which the web page is requested and/or the advertisement management system 210 can provide the display thresholds to the client device 206 in response to the request for the web page or advertisements, respectively. In such scenarios, the display data script can cause the client device 206 to determine whether an impression has occurred and send the determination to the advertisement management system 210.

As described above, the display thresholds can include, for example, thresholds that specify a minimum zoom level or zoom level range of the viewport, a minimum percentage of the advertisement displayed in the viewport (e.g., at least twenty percent of the advertisement must be displayed in the viewport), and/or minimum duration for which an advertisement is displayed in the viewport. The display thresholds can be set to levels that if satisfied by the display of an advertisement are deemed to be an impression. The display thresholds can be set by the advertisers or by the system 220.

The displays thresholds can be static thresholds. For example, the thresholds are always the same for a particular mobile device and/or web page. The thresholds can also vary based on the display state (or other thresholds). The zoom level threshold can, for example, vary based on the proportional measurement and/or the display duration measurement. For example, the initial display thresholds for the proportional measurement, the zoom level measurement, and the duration measurement are, respectively, 50%, 60% and 10 seconds. If the display data for a web page indicate that an advertisement was fully displayed in the viewport for 20 seconds (i.e., the proportional measurement is 1 and duration measurement is 20 seconds), then the threshold for the zoom level measurement can be decreased (e.g., to 35%). Because of the long display time and the full display of the advertisement in the viewport, it can be reasonably assumed that a user would still discern (or have an opportunity to discern) the advertisement even at the decreased zoom level (e.g., the advertiser received the benefit of the impression). Thus if the display data indicate that the zoom level was at least 35%, an impression would be determined to have occurred.

Whether an impression for the content item occurred is determined based on the zoom level measurement, the proportional measurement, and the display duration measurement (310). As described above, the determination of an impression can be based on whether display data indicate that zoom level measurement satisfies the threshold for the zoom level, the proportional measurement satisfies the threshold for the proportion of the advertisement displayed, and/or the display duration measurement satisfies the threshold for the display duration. In some implementations, all three thresholds must be satisfied for the determination of an impression while in other implementations only one or two thresholds need be satisfied. The determination of an impression is described, for example, with reference to FIGS. 4A-4B below.

Figure 4C:
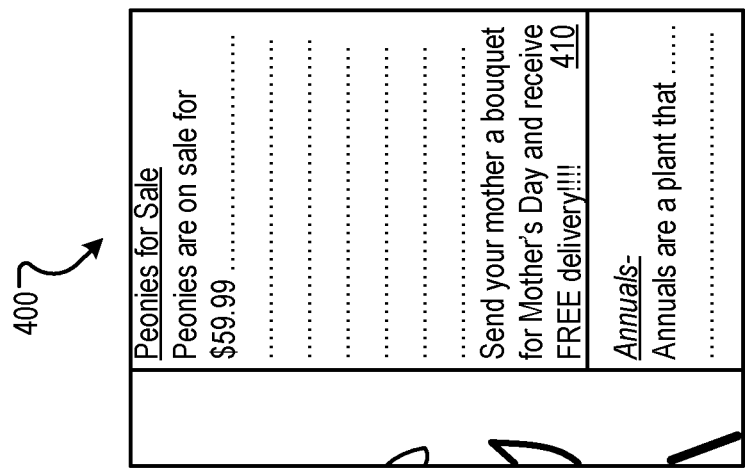
FIGS. 4A-4C are screen shots of an example web page displayed in a viewport having first, second and third display states, respectively.
Figure 4B:
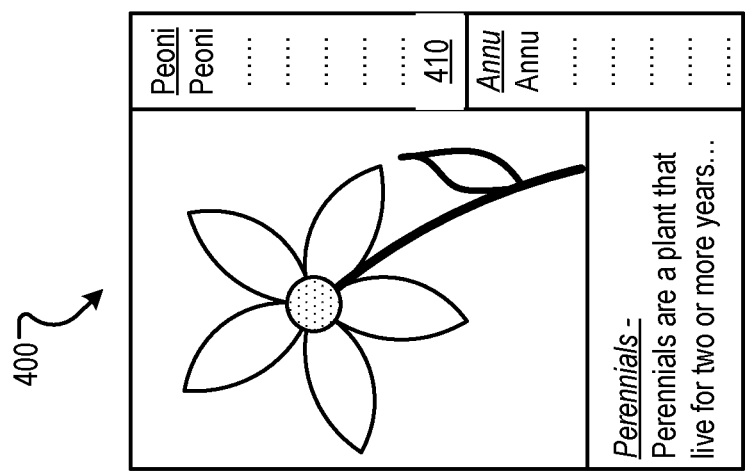
Figure 4A:
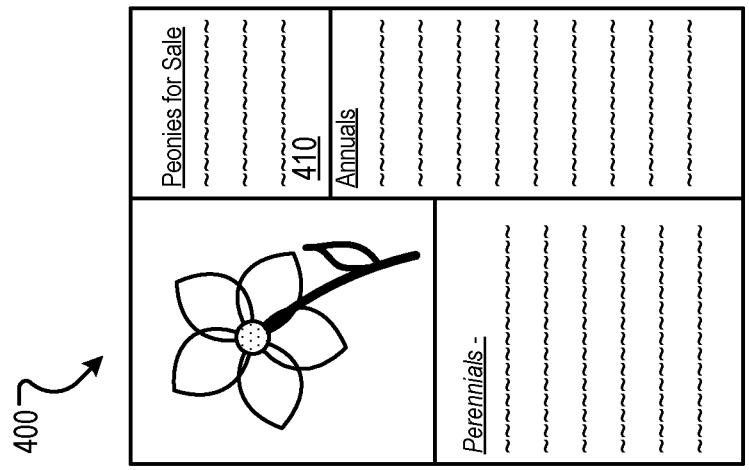

FIGS. 4A-4C are screen shots of an example web page 400 displayed in a viewport and having first, second and third display states, respectively.

FIG. 4A is a screen shot of web page 400 rendered in a first display state. The display data specifying the first display state is used to determine that the proportional measurement of the advertisement 410 is 100%, the zoom level measurement is 0%, and the display duration is 8 seconds. Given that the display thresholds for the proportional measurement, the zoom level measurement, and the display duration measurement are, respectively, 50%, 60% and 6 seconds, it is determined that an impression did not occur for the advertisement 410 because the zoom level measurement did not satisfy the zoom level threshold. As illustrated in FIG. 4A the content of the advertisement 410 is not legible, and thus an impression did not occur even though the advertisement 410 was fully displayed for eight seconds.

FIG. 4B is a screen shot of web page 400 rendered in a second display state. The display data specifying the second display state is used to determine that the proportional measurement of the advertisement 410 is 20%, the zoom level measurement is 70%, and the display duration is 8 seconds. Given that the display thresholds for the proportional measurement, the zoom level measurement, and the display duration measurement have not changed, it is determined that an impression did not occur for the advertisement 410 because the proportional measurement did not satisfy the proportion measurement threshold. As illustrated in FIG. 4B, only ⅕ (i.e., 20%) of the content of the advertisement 410 is displayed, and thus an impression did not occur because not enough of the advertisement was presented to convey the advertisement's message (even though some of the content of the advertisement 410 was discernable and displayed for eight seconds).

FIG. 4C is a screen shot of web page 400 rendered in a third display state. The display data specifying the third display state is used to determine that the proportional measurement of the advertisement 410 is 90%, the zoom level measurement is 80%, and the display duration is 8 seconds. Given that the display thresholds for the proportional measurement, the zoom level measurement, and the display duration measurement have not changed, it is determined that an impression did occur for the advertisement 410. As illustrated in FIG. 4C, the content of the advertisement 410 is discernable or deemed discernable according to the satisfaction of the display thresholds.

An advertiser is charged for an impression only if the display data indicate that the display thresholds are satisfied (312). As described above, once the zoom level measurement, the proportional measurement, and/or the display duration measurement are determined from the display data, these measurements are compared to the corresponding display thresholds to determine whether an impression occurred. If an impression did occur then the advertiser is charged for an impression, and if an impression did not occur then the advertiser is not charged for an impression.

In some implementations, a location metric that defines a number of impressions of the content item relative to the location of the content item on the web page is determined. For example, the location of the content item can be the location of the content item relative to the dimensions of the web page. This location often corresponds to standard advertisement ad slots such as a right-hand-side ad slot or banner ad slot. Impressions for advertisements can be determined, for example, as described above with reference to FIG. 3, and associated with the location of the advertisement. For example, if an advertisement placed in the banner ad slot had an impression (e.g., was displayed in the viewport in a manner that satisfied the display thresholds) then the location metric would indicate that an advertisement (or the particular advertisement of the impression) placed in the banner ad slot received an impression. The location metrics gathered for numerous advertisements and numerous web pages can be analyzed to determine advertisement locations that have the highest rate of impressions. Future placements of advertisements can be based on the location metrics.

As described above, the levels of the display thresholds for determining impressions can vary based on the corresponding zoom level measurement, the proportional measurement and/or display duration measurement. For example, the threshold for the zoom level measurement may change based on the display duration measurement and/or the proportional measurement. The threshold for the zoom level measurement may be 0.5 if the display duration measurement is 10 seconds and the proportional measurement is 0.6, and may be increased to 0.75 if the display duration measurement is 8 seconds and the proportional measurement is 0.55.

Similarly, based on the proportional measurement and/or the zoom level measurement, the threshold for the display duration measurement may change. Likewise, based on the display duration measurement and/or the zoom level measurement, the threshold for the proportional measurement may change. In sum, the levels of the display thresholds, and hence the determination of an impression, are a function of the zoom level measurement, the proportional measurement, and/or the display duration measurement.

Although the above description has focused on determining impressions on mobile devices, the systems and methods described herein can be used to determine impressions for other devices having viewports such as laptop computers.

The description above has focused on determining an impression for an advertisement placed in a webpage. However, the methods and systems described herein can also determine impressions for advertisements placed on other resources such as maps, images, games, online documents. For example, a web browser can have a toolbar with the functionality of the data script, and the toolbar can operate to generate the display data for resources rendered by the web browser. In another example, an online document (e.g., a pdf document) can be displayed in the web browser by use of a document viewing program (e.g., a pdf viewing program). The document viewing program can include an extension that can be utilized to generate display data for the online document.

§ 3.0 Example Process for Determining Illegitimate Content Selection

A selection of a content item (e.g., click-through) occurs when content items such as advertisements are placed on rendered web pages and are selected (e.g., clicked-on). Such selections are often used identify user interest in the content item, to track the performance of the content item (e.g., click-through-rate), and to charge advertisers if the content item is an advertisement. However, some selections of the content item result from the activities of automated scripts such as spamming bots, and not users. Selections by spamming bots do not represent user interest in the content item and, for example, skew the performances of the content item. Further such selections are not of benefit to the advertisers, and should not result in a charge to the advertisers.

Figure 5:
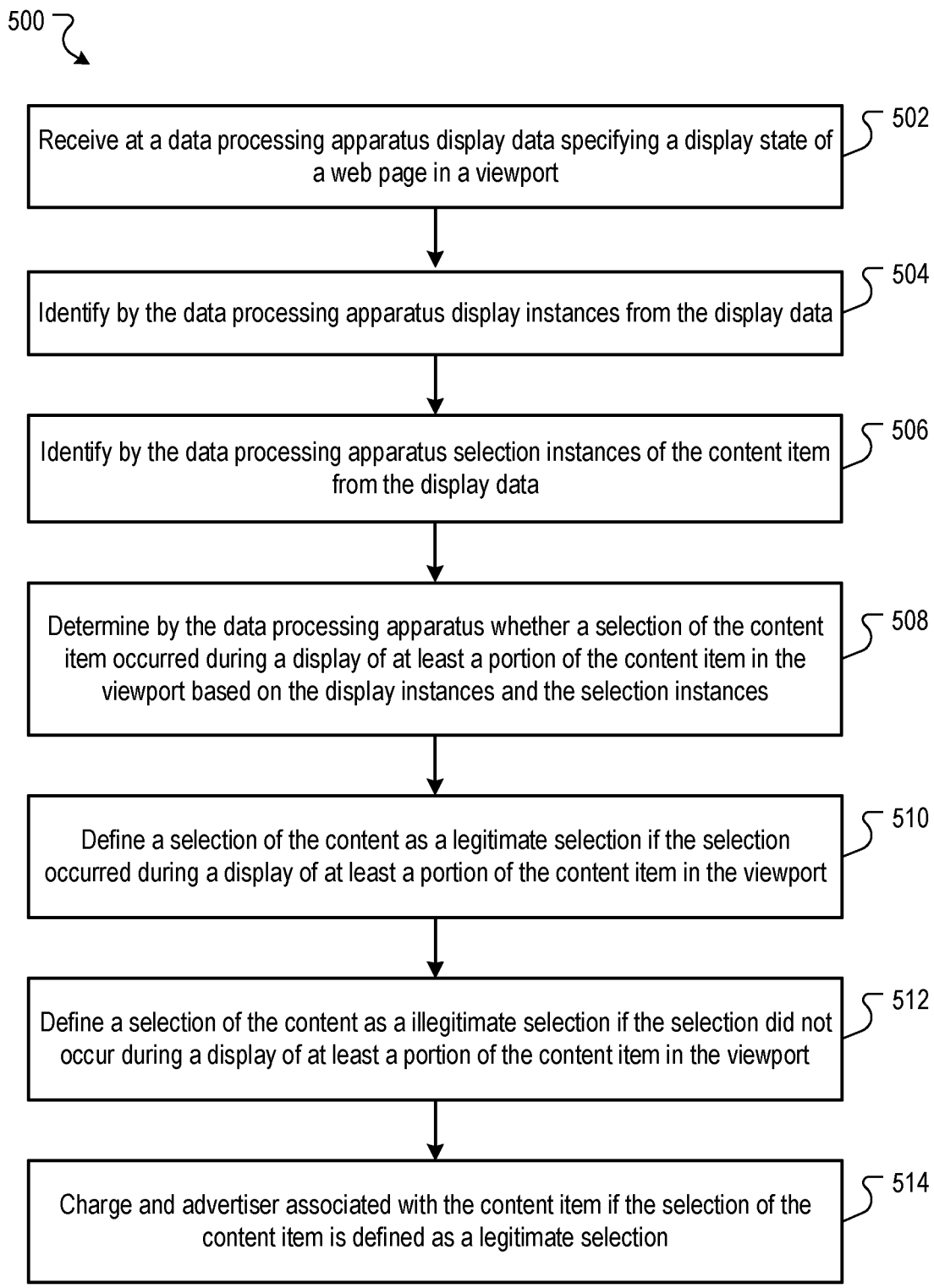
FIG. 5 is a flow chart of an example process for determining illegitimate content selection.

FIG. 5 is a flow chart of an example process 500 for determining illegitimate content selection. Illegitimate content selections are selections of content such as advertisements attributable to sources other than user selections, e.g., selection by spamming bots. The process steps of FIG. 5 can be performed, for example, by the impression determination system 220.

Display data specifying a display state of a web page in a viewport is received (502). The display data can be the same display data described above with reference to FIG. 3, and can be generated according to, for example, instructions in the display data script. The display data script can cause the web browser to send the display data to the impression determination system 220.

Display instances from the display data are identified (504). A display instance is a display of at least a portion of the content item in the viewport and can be derived based on the display states of the web page. In some implementations, a display of the content item is only display instance if the display satisfies certain display thresholds. For example, these display thresholds can be thresholds for the zoom level measurement, the proportional measurement, and/or the display duration measurement described above with reference to FIG. 3.

Selection instances of the content item are identified from the display data (506). A selection instance is a selection of the content item (e.g., advertisement). A selection instance can be identified by the web browser as directed by the display data script when a content item is clicked on. The selection instances can be included in the display data. In some implementations, selection instances can be identified from publisher activity logs for the web page and provided to the impression determination system 220.

Whether a selection of the content item occurred during a display of at least a portion of the content item in the viewport is determined based on the display instances and the selection instances (508). A selection of the content item occurred while the content item was displayed in the viewport if the display instance and the selection instance coincide. For example, the selection instance and the display instance coincide if time data included in the display data indicate that the selection instance occurred at a time that overlaps with the display of the content item in the viewport.

A selection of the content item is defined as a legitimate selection if the selection occurred during a display of at least a portion of the content item in the viewport (510). If the selection of the content item occurred while it was displayed in the viewport, then it can be reasonably assumed that the selection was a user selection, as the content item would be visible in the viewport to a user of the device.

Conversely, a selection of the content item is defined as a illegitimate selection if the selection did not occur during a display of at least a portion of the content in the viewport (512). As it is unlikely that a user did or is capable of selecting a content item while the content item is not displayed in the viewport, the selection can be defined as an illegitimate selection. For example, a spamming bot can select a content item while it is not displayed in the viewport. Such selections do not represent user selections and, thus, should not be defined as legitimate selections, for example, indicating user interest.

An advertiser associated with the content item is charged for a selection only if the selection is defined as a legitimate selection (514). Thus if the content item is selected while it is displayed in the viewport then the advertiser is charged for a selection. Likewise, if the content item is selected during a time period when the content item is not displayed in the viewport then the advertiser is not charged for the selection as the selection most likely resulted from spamming activities.

§ 4.0 Example Process for Providing an Alternative Representation of a Content Item In some scenarios the zoom level of the viewport is set to permit all of the web content on the web page or a large portion of the web content of the web page to be displayed simultaneously (e.g., the viewport is zoomed-out). However, as described above, if the viewport of the mobile device is zoomed-out, the text and/or graphics of the content items on the web page are likely illegible.

In these scenarios an alternative representation, which is legible at the zoomed-out zoom level (e.g., a zoom level measurement of 10%), can be displayed in place of a content item. For example, if the content item is a textual advertisement for a product from company X then the alternative representation can be the logo of company X. Thus if the zoom level is such that the advertisement would not legible then the logo for company X can be displayed in place of the advertisement so that a user can at least recognize that the advertisement is from company X. If the zoom level is increased (i.e., zoomed-in) so that the advertisement would be legible then the advertisement can replace the logo in the viewport.

Figure 6:
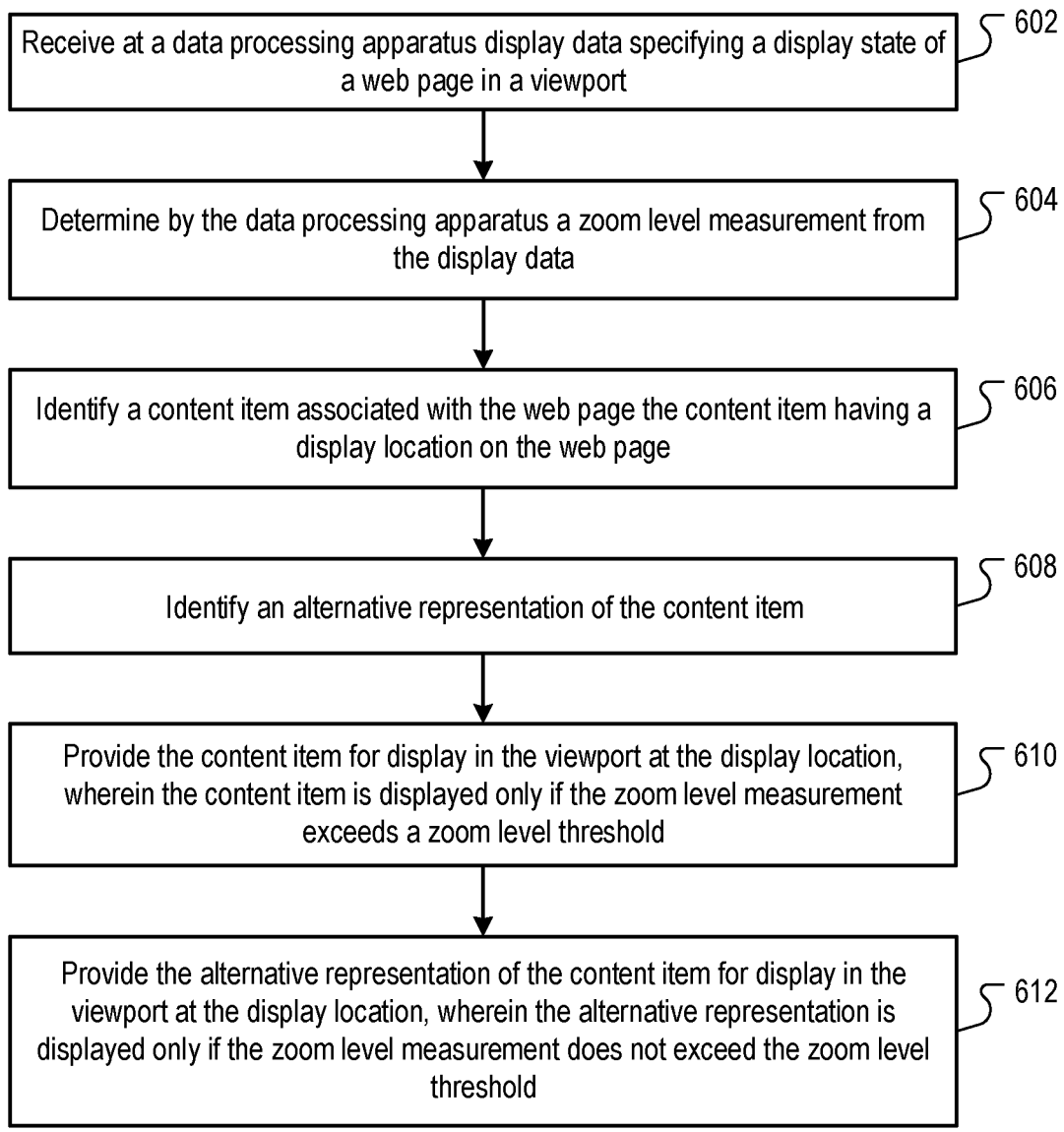
FIG. 6 is a flow chart of an example process for providing an alternative representation of a content item.

FIG. 6 is a flow chart of an example process 600 for providing an alternative representation of a content item. Process 600 can provide for display of the content item or the alternative representation of the content item based on the zoom level (e.g., zoom level measurement) of the viewport. The advertisement management system 210 can, for example, perform the steps of process 600.

Display data specifying a display state of a web page in a viewport is received (602). The display data can be the same display data described above with reference to FIG. 3, and can be generated according to, for example, instructions in the display data script. The display data script can cause the web browser to send the display data to the impression determination system 220.

A zoom level measurement is determined from the display data (604). The zoom level measurement is a measure of a zoom level of the viewport. The zoom level measurement can be determined as described above with reference to FIG. 3, process step 306.

A content item associated with the web page is identified (606). The content item can be identified by an annotation from a markup language such as an advertisement tag. The content item has a display location on the web page. The display location of the content item can be specified by the display data relative to the dimensions of the web page, as described above.

An alternative representation of the content item is identified (608). For example, the display data script can cause the web browser to identify an alternative representation of the content item provided to the client device by the advertisement management system 210. For example, the advertisement management system 210 can provide the content item and/or the alternative representation of the content item in response to a request for the content item. The alternative representation can be provided to the advertisement management system 210 by the advertiser and stored in the advertisement data store 234. An alternative representation can be, for example, a logo for the advertiser of the content item. However, any representation that is more readily discernable at low zoom levels can be used, such as images of the subject of the advertisement (e.g., images of the product). The alternative representation can be provided with the advertisement.

The content item is provided for display in the viewport at the display location and is displayed only if the zoom level measurement exceeds a zoom level threshold (610). As described above, the content item can be provided to the client device by the advertisement management system 210. The display data script can cause the web browser to determine that the zoom level measurement of the viewport exceeds the zoom level threshold, and display the content item at the display location based on the determination. For example, if the zoom level threshold is 70% and the zoom level measurement is 80% then the content item can be displayed.

The alternative representation of the content item is provided for display in the viewport at the display location and is displayed only if the zoom level measurement does not exceed the zoom level threshold (612). As described above, the content item can be provided to the client device by the advertisement management system 210. The display data script can cause the web browser to determine that the zoom level measurement of the viewport does not exceed the zoom level threshold, and display the alternative representation at the display location based on the determination. For example, if the zoom level threshold is 70% and the zoom level measurement is 10% then the alternative representation can be displayed. Thus, for example, at least some branding information can be conveyed to the user by displaying the alternative representation at certain zoom levels, even though at those same zoom levels the content item would be illegible.

If the zoom level measurement changes (e.g., the user causes the viewport to be zoomed-in) from a zoom level measurement that did not exceed the zoom level threshold to a zoom level measurement that does exceed the zoom level threshold, the alternative representation can be replaced with the content item. This permits a user to recognize the alternative representation of the content item at the low zoom levels and then zoom-in on the alternative representation to read the actual content item. Likewise if the content item is displayed at a high zoom level, and the zoom level of the viewport is decreased (e.g., 80% to 5%) then the alternative representation can replace the content item.

Figure 7A:
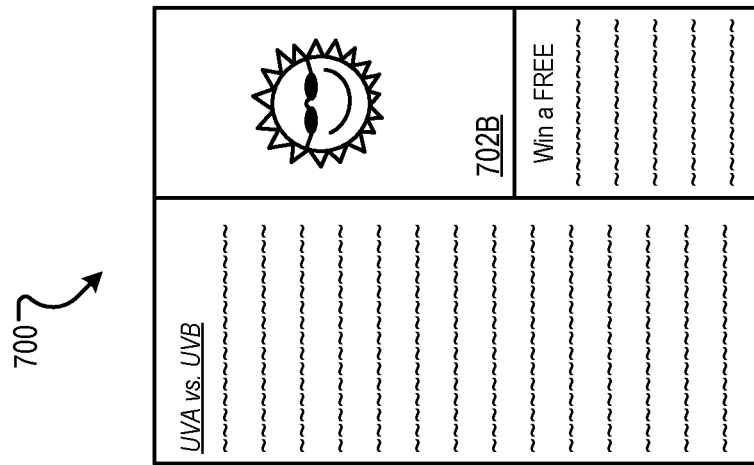
FIGS. 7A-7B are screen shots of an example web page with a content item displayed at a content item location and alternative representation of the content item displayed at the content item location, respectively.
Figure 7B:
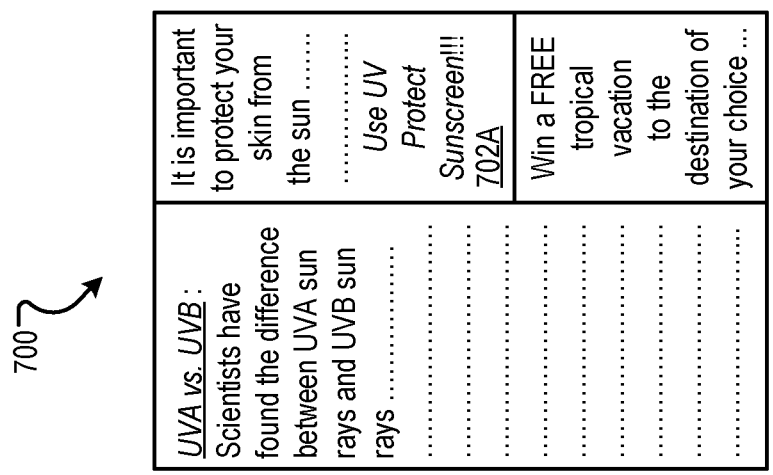

FIGS. 7A-7B are screen shots of an example web page 700 with a content item displayed at a content item location and alternative representation of the content item displayed at the content item location, respectively.

FIG. 7A illustrates the content item 702A displayed on the web page 700 in a viewport having a zoom level measurement that exceeds the zoom level threshold. Thus the content of the web page 700 including the content item 702A (e.g., text of graphics) can be discerned (e.g., read or recognized). FIG. 7B illustrates an alternative representation of the content item 702B displayed on the web page 700 in a viewport having a zoom level measurement that does not exceed the zoom level threshold. The content of the web page 700 including the alternative representation of the content item 702B (e.g., a logo) can be discerned. However, it is unlikely that the content item 702A could be discerned at the zoom level of the viewport in FIG. 7B.

The above description has focused on the content items being advertisements. The methods and systems described above can also be applied to any web content. For example, a publisher may desire to know if a user viewed an article or an image. A article or image view can be determined in a manner analogous to determining an impressive (e.g., the use of display thresholds)

§ 5.0 Example Processing System

Figure 8:
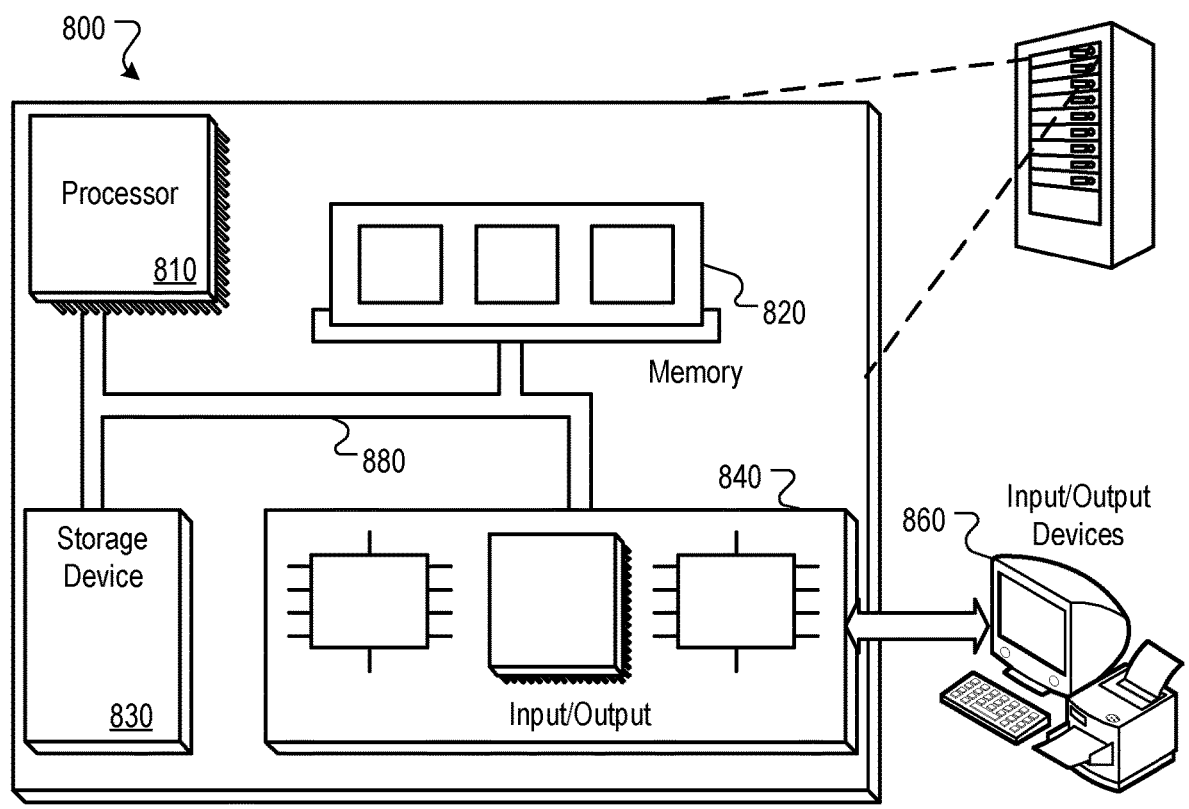
FIG. 8 is block diagram of an example computer processing system that can be used to determine impressions.

FIG. 8 is block diagram of an example computer processing system that can be used to determine impressions. The system 800 can be used to realize a variety of different types of computer devices, such as the client devices 206 or server and computer devices on which the advertisement management system 210 is implemented.

The system 800 includes a processor 810, a memory 820, a storage device 830, and an input/output device 840. Each of the components 810, 820, 830, and 840 can, for example, be interconnected using a system bus 880. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 900. In one implementation, the storage device 830 is a computer-readable medium. In various different implementations, the storage device 830 can, for example, include a hard disk device, an optical disk device, or some other large capacity storage device.

The input/output device 840 provides input/output operations for the system 800. In one implementation, the input/output device 840 can include one or more of a network interface devices, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 860. Other implementations, however, can also be used, such as mobile computing devices, mobile communication devices, etc.

Although an example processing system has been described in FIG. 8, embodiments of the subject matter and the functional operations described in this specification can be implemented in other digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine readable storage device, a machine readable storage substrate, a memory device, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying Figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
for each of a plurality of content items:
receiving, at a data processing apparatus, display data specifying a display state of a web page in a viewport, the web page including a content item and other content for display;
determining, based on the display data, a measured display location of the content item within the web page;
determining, by the data processing apparatus, a proportional measurement from the display data, the proportional measurement being a measure of an area of a first portion of the content item displayed in the viewport at a particular time relative to an area of a second portion of the content item that is not displayed in the viewport at the particular time;
determining, by the data processing apparatus, a zoom level measurement from the display data, the zoom level measurement being a measure of a zoom level of the viewport, wherein determining the zoom level comprises,
determining, using a display data script that evaluates a document object model (DOM) representation of the web page, an actual display size of the content item in pixels squared, and
determining the zoom level measurement based on the actual display size of the content item and an original display size of the content item; and
determining, by the data processing apparatus, whether an impression for the content item occurred based on the zoom level measurement and the proportional measurement;
determining, for each of a plurality of display locations for the plurality of content items, an impression rate for the display location based on (i) a count of a number of the plurality of content items that have a measured display location that matches the display location and for which an impression was determined to have occurred and (ii) a total number of the plurality of content items that have a measured display location that matches the display location; and adjusting a location at which future content items are displayed within the web page based on the impression rate for each display location.

2. The method of claim 1, wherein determining whether an impression for the content item occurred based on the zoom level measurement and the proportional measurement comprises:

determining, by the data processing apparatus and based on the zoom level measurement and the proportional measurement, that the content item was discernible to a user; and in response to determining that the content item was discernible to the user, determining that an impression for the content item occurred.

3. The method of claim 1, comprising:

determining, by the data processing apparatus, a display duration measurement from the display data, the display duration measurement being a measure of a duration that at least a portion of the content item is displayed in the viewport, wherein determining whether an impression for the content item occurred based on the zoom level measurement and the proportional measurement comprises determining whether an impression for the content item occurred based on a combination of the zoom level measurement, the proportional measurement, and the display duration measurement.

4. The method of claim 1, wherein determining whether an impression for the content item occurred based on the zoom level measurement and the proportional measurement comprises:

determining whether the zoom level measurement exceeds a zoom level threshold;

determining whether the proportional measurement exceeds a proportional measurement threshold; and determining that an impression occurred when both the zoom level measurement exceeds the zoom level threshold and the proportional measurement exceeds the proportional measurement threshold.

5. The method of claim 4, further comprising:

determining the proportional measurement threshold based at least in part on the zoom level measurement, the proportional measurement threshold varying based on changes to the zoom level measurement; and determining the zoom level threshold based at least in part on the proportional measurement, the zoom level threshold varying based on changes to the proportional measurement.

6. The method of claim 5, wherein determining the zoom level threshold comprises reducing the zoom level threshold in response to an increase in the proportional measurement.

7. The method of claim 4, wherein determining that an impression occurred when the zoom level measurement exceeds the zoom level threshold and the proportional measurement exceeds the proportional measurement threshold comprises determining that an impression occurred when the zoom level measurement exceeds the zoom level threshold during a time period and the proportional measurement exceeds the proportional measurement threshold during a same time period.

8. The method of claim 4, wherein the zoom level threshold varies based on the proportional measurement and the proportional measurement threshold varies based on the zoom level.

9. The method of claim 1, wherein zoom level measurement is based on the actual display size of the content item in pixels squared, a physical area of a viewport in which the web page is displayed, an area of the viewport in pixels squared, and an original size of the content item.

10. The method of claim 9, wherein determining the zoom level measurement comprises:

determining a ratio between the actual display size of the content item in pixels squared and the physical area of the viewport, wherein the physical area of the viewport is measured in pixels squared;

determining a product of the ratio and the area of the viewport in pixels squared; and determining, as the zoom level, a ratio between the product and the original display size of the content item, wherein the original display size of the content item is measured in inches squared.

11. A system, comprising:

one or more data processing apparatus; and a memory storage apparatus in data communication with the one or more data processing apparatus, the memory storage apparatus storing instructions executable by the one or more data processing apparatus and that upon such execution cause the one or more data processing apparatus to perform operations comprising:

for each of a plurality of content items:

receiving, at a data processing apparatus, display data specifying a display state of a web page in a viewport, the web page including a content item and other content for display;

determining, based on the display data, a measured display location of the content item within the web page;

determining, by the data processing apparatus, a proportional measurement from the display data, the proportional measurement being a measure of an area of a first portion of the content item displayed in the viewport at a particular time relative to an area of a second portion of the content item that is not displayed in the viewport at the particular time;

determining, by the data processing apparatus, a zoom level measurement from the display data, the zoom level measurement being a measure of a zoom level of the viewport, wherein determining the zoom level comprises, determining, using a display data script that evaluates a document object model (DOM) representation of the web page, an actual display size of the content item in pixels squared, and determining the zoom level measurement based on the actual display size of the content item and an original display size of the content item; and determining, by the data processing apparatus, whether an impression for the content item occurred based on the zoom level measurement and the proportional measurement;

determining, for each of a plurality of display locations for the plurality of content items, an impression rate for the display location based on (i) a count of a number of the plurality of content items that have a measured display location that matches the display location and for which an impression was determined to have occurred and (ii) a total number of the plurality of content items that have a measured display location that matches the display location; and adjusting a location at which future content items are displayed within the web page based on the impression rate for each display location.

12. The system of claim 11, wherein determining whether an impression for the content item occurred based on the zoom level measurement and the proportional measurement comprises:

determining, based on the zoom level measurement and the proportional measurement, that the content item was discernible to a user; and in response to determining that the content item was discernible to the user, determining that an impression for the content item occurred.

13. The system of claim 11, wherein the operations comprise:

determining a display duration measurement from the display data, the display duration measurement being a measure of a duration that at least a portion of the content item is displayed in the viewport, wherein determining whether an impression for the content item occurred based on the zoom level measurement and the proportional measurement comprises determining whether an impression for the content item occurred based on a combination of the zoom level measurement, the proportional measurement, and the display duration measurement.

14. The system of claim 11, wherein determining whether an impression for the content item occurred based on the zoom level measurement and the proportional measurement comprises:

determining whether the zoom level measurement exceeds a zoom level threshold;

determining whether the proportional measurement exceeds a proportional measurement threshold; and determining that an impression occurred when both the zoom level measurement exceeds the zoom level threshold and the proportional measurement exceeds the proportional measurement threshold.

15. The system of claim 14, wherein the operations comprise:

determining the proportional measurement threshold based at least in part on the zoom level measurement, the proportional measurement threshold varying based on changes to the zoom level measurement; and determining the zoom level threshold based at least in part on the proportional measurement, the zoom level threshold varying based on changes to the proportional measurement.

16. The system of claim 15, wherein determining the zoom level threshold comprises reducing the zoom level threshold in response to an increase in the proportional measurement.

17. The system of claim 14, wherein determining that an impression occurred when the zoom level measurement exceeds the zoom level threshold and the proportional measurement exceeds the proportional measurement threshold comprises determining that an impression occurred when the zoom level measurement exceeds the zoom level threshold during a time period and the proportional measurement exceeds the proportional measurement threshold during a same time period.

18. The system of claim 14, wherein the zoom level threshold varies based on the proportional measurement and the proportional measurement threshold varies based on the zoom level.

19. A non-transitory computer storage medium encoded with a computer program, the computer program comprising instructions that when executed by a data processing apparatus cause the data processing apparatus to perform operations comprising:

for each of a plurality of content items:

receiving, at a data processing apparatus, display data specifying a display state of a web page in a viewport, the web page including a content item and other content for display;

determining, based on the display data, a measured display location of the content item within the web page;

determining, by the data processing apparatus, a proportional measurement from the display data, the proportional measurement being a measure of an area of a first portion of the content item displayed in the viewport at a particular time relative to an area of a second portion of the content item that is not displayed in the viewport at the particular time;

determining, by the data processing apparatus, a zoom level measurement from the display data, the zoom level measurement being a measure of a zoom level of the viewport, wherein determining the zoom level comprises, determining, using a display data script that evaluates a document object model (DOM) representation of the web page, an actual display size of the content item in pixels squared, and determining the zoom level measurement based on the actual display size of the content item and an original display size of the content item; and determining, by the data processing apparatus, whether an impression for the content item occurred based on the zoom level measurement and the proportional measurement;

determining, for each of a plurality of display locations for the plurality of content items, an impression rate for the display location based on (i) a count of a number of the plurality of content items that have a measured display location that matches the display location and for which an impression was determined to have occurred and (ii) a total number of the plurality of content items that have a measured display location that matches the display location; and adjusting a location at which future content items are displayed within the web page based on the impression rate for each display location.

20. The non-transitory computer storage medium of claim 19, wherein determining whether an impression for the content item occurred based on the zoom level measurement and the proportional measurement comprises:

determining, based on the zoom level measurement and the proportional measurement, that the content item was discernible to a user; and in response to determining that the content item was discernible to the user, determining that an impression for the content item occurred.

* * * * *